(12) United States Patent
Kitamura et al.

(10) Patent No.: US 8,743,399 B2
(45) Date of Patent: Jun. 3, 2014

(54) IMAGE FORMING SYSTEM, APPARATUS, AND METHOD PERMITTING SELECTION OF AN IMAGE TO BE FORMED

(75) Inventors: Yumi Kitamura, Osaka (JP); Yusuke Nakagoshi, Osaka (JP)

(73) Assignee: Kyocera Document Solutions Inc. (JP)

( * ) Notice: Subject to any disclaimer, the term of this patent is extended or adjusted under 35 U.S.C. 154(b) by 222 days.

(21) Appl. No.: 13/302,435

(22) Filed: Nov. 22, 2011

(65) Prior Publication Data

US 2012/0133979 A1    May 31, 2012

(30) Foreign Application Priority Data

Nov. 30, 2010  (JP) ................ P2010-267362

(51) Int. Cl.
G06F 3/12    (2006.01)
G03G 15/00   (2006.01)

(52) U.S. Cl.
USPC .......................................... 358/1.15; 399/81

(58) Field of Classification Search
CPC ............ G03G 15/502; H04N 1/00127; H04N 1/00326; H04N 1/00339; H04N 2201/0082
USPC .......................................... 358/1.15; 399/81
See application file for complete search history.

(56) References Cited

U.S. PATENT DOCUMENTS

| | | | |
|---|---|---|---|
| 2002/0136560 A1* | 9/2002 | Sadowara et al. | 399/27 |
| 2007/0188801 A1 | 8/2007 | Tatsumi | 358/1.15 |
| 2008/0117450 A1* | 5/2008 | Claiborne et al. | 358/1.15 |
| 2009/0073266 A1* | 3/2009 | Abdellaziz Trimeche et al. | 348/180 |

FOREIGN PATENT DOCUMENTS

| | | |
|---|---|---|
| JP | 2003-283750 | 10/2003 |
| JP | 2004-241199 | 8/2004 |
| JP | 2005-254571 | 9/2005 |
| JP | 2007-210162 | 8/2007 |

* cited by examiner

*Primary Examiner* — Fred Guillermety
(74) *Attorney, Agent, or Firm* — Ostrolenk Faber LLP

(57) ABSTRACT

An image forming system includes: an information operation apparatus which receives screen data and image forming data corresponding to the screen data; an image forming apparatus which communicates with the information operation apparatus; and a display apparatus which communicates with the information operation apparatus and which displays an image on a display portion based on the screen data received from the information operation apparatus, wherein when receiving an image forming confirmation command, the image forming apparatus receives the image forming data corresponding to the image shown on the display apparatus from the information operation apparatus, displays an image which indicates the image forming data and forms the image based on the image forming data if an image forming command is received.

15 Claims, 3 Drawing Sheets

IMAGE FORMING SYSTEM, APPARATUS, AND METHOD PERMITTING SELECTION OF AN IMAGE TO BE FORMED

BACKGROUND OF THE INVENTION

1. Field of the Invention

The present invention relates to an image forming system, an image forming apparatus and an image forming method.

Priority is claimed on Japanese Patent Application No. 2010-267362, filed Nov. 30, 2010, the content of which is incorporated herein by reference.

2. Description of Related Art

In recent years, the information data constituted from images and characters are distributed by using a network, for example, the Internet, and a display device shows the information based on the distributed information data. Such a display device is, for example, a cellular phone and/or a smartphone which is different from, for example, a TV set and a newspaper that repeatedly show the same information because the smartphone can switch the information in accordance with both a position or place of the smartphone and the time, and due to this, it is possible to display the information which is effective or impressive for a specifically targeted layer of people. Further, it is possible without any difficulty to switch the information on such a display device by updating the information data stored in a distribution source (distribution server), and therefore, it does not take time and is not a labor to switch the information data.

There are outputting methods of the information other than such a method of displaying the information on the display device, for example, a method in which the information is printed by an image forming apparatus, for example, a multi-function printer. For example, in a shop or a store such as a convenience store, a server (information operation apparatus) is installed together with the image forming apparatus, and the information operation apparatus stores the information data distributed from the distribution server. When receiving an output command, the image forming apparatus forms an image of the information based on the information data received from the information operation apparatus. Further, a display device is connected to the above-described information operation apparatus. The display device shows information based on the information data received from the information operation apparatus. When receiving an output command, the image forming apparatus forms the image of the information corresponding to a screen shown on the display apparatus.

However, in the above-described conventional technique, the information shown on the display apparatus is updated in a predetermined time, and there is a possibility in which, if the information is updated at a time when the user inputs an output command to the image forming apparatus, an image of information different from the information which the user wants is formed on a printing paper. Thus, there is a possibility that an image of information different from the information which the user wants is formed on a printing paper.

The present invention relates to, for example, the above-described conventional technique.

SUMMARY OF THE INVENTION

The present invention includes, for example, an aspect described below.

A first aspect is an image forming system including: an information operation apparatus which receives screen data and image forming data corresponding to the screen data; an image forming apparatus which communicates with the information operation apparatus; and a display apparatus which communicates with the information operation apparatus and which displays an image on a display portion based on the screen data received from the information operation apparatus, wherein when receiving an image forming confirmation command, the image forming apparatus receives the image forming data corresponding to the image shown on the display apparatus from the information operation apparatus, displays an image which indicates the image forming data and forms the image based on the image forming data if an image forming command is received.

DETAILED DESCRIPTION OF THE INVENTION

Hereinafter, a first embodiment is described in reference to the drawings. It should be noted that the description below is not a limitation on the present invention.

Figure 1:
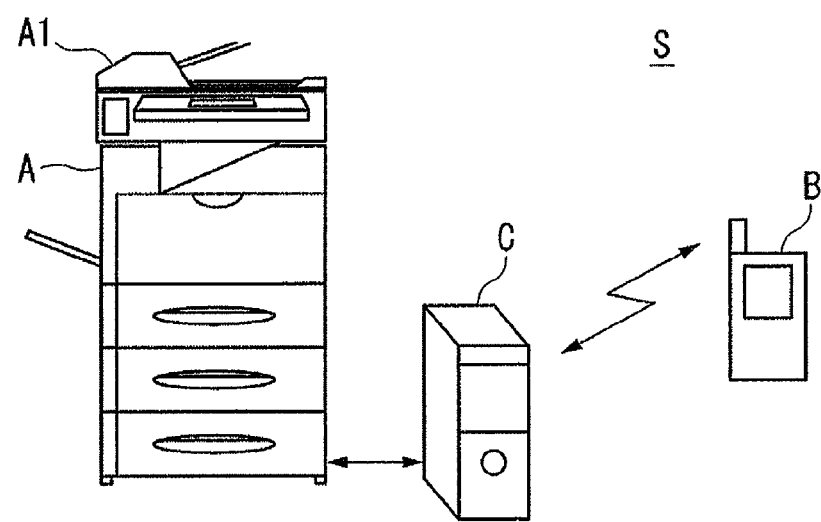
FIG. 1 is a system constitution drawing of an image forming system S of a first embodiment.

As shown in FIG. 1, an image forming system S of this embodiment is constituted from a multi-function printer (image forming apparatus) A, a mobile terminal (display device) B and an information operation apparatus C.

The multi-function apparatus A includes a copy function, a scan function and a facsimile transmission/reception function, is connected to the information operation apparatus C for communication and forms images based on PDL format (page description language) data input received from the information operation apparatus C.

The mobile terminal B is wirelessly connected to the information operation apparatus C via a wireless LAN (local area network) and shows a screen based on screen data received from the information operation apparatus C. It should be noted that the screen displayed on the mobile terminal B is a still image and/or a moving picture.

The information operation apparatus C is a computer which is connected via a wire or wirelessly connected to the multi-function printer A and the mobile terminal B, stores the PDL format data which relates to image data and the screen data, requests the multi-function printer A to form an image based on the image data and requests the mobile terminal B to display a window based on the screen data.

Hereinafter, a functional constitution of the above-described multi-function printer A is explained in reference to FIG. 2.

Figure 2:
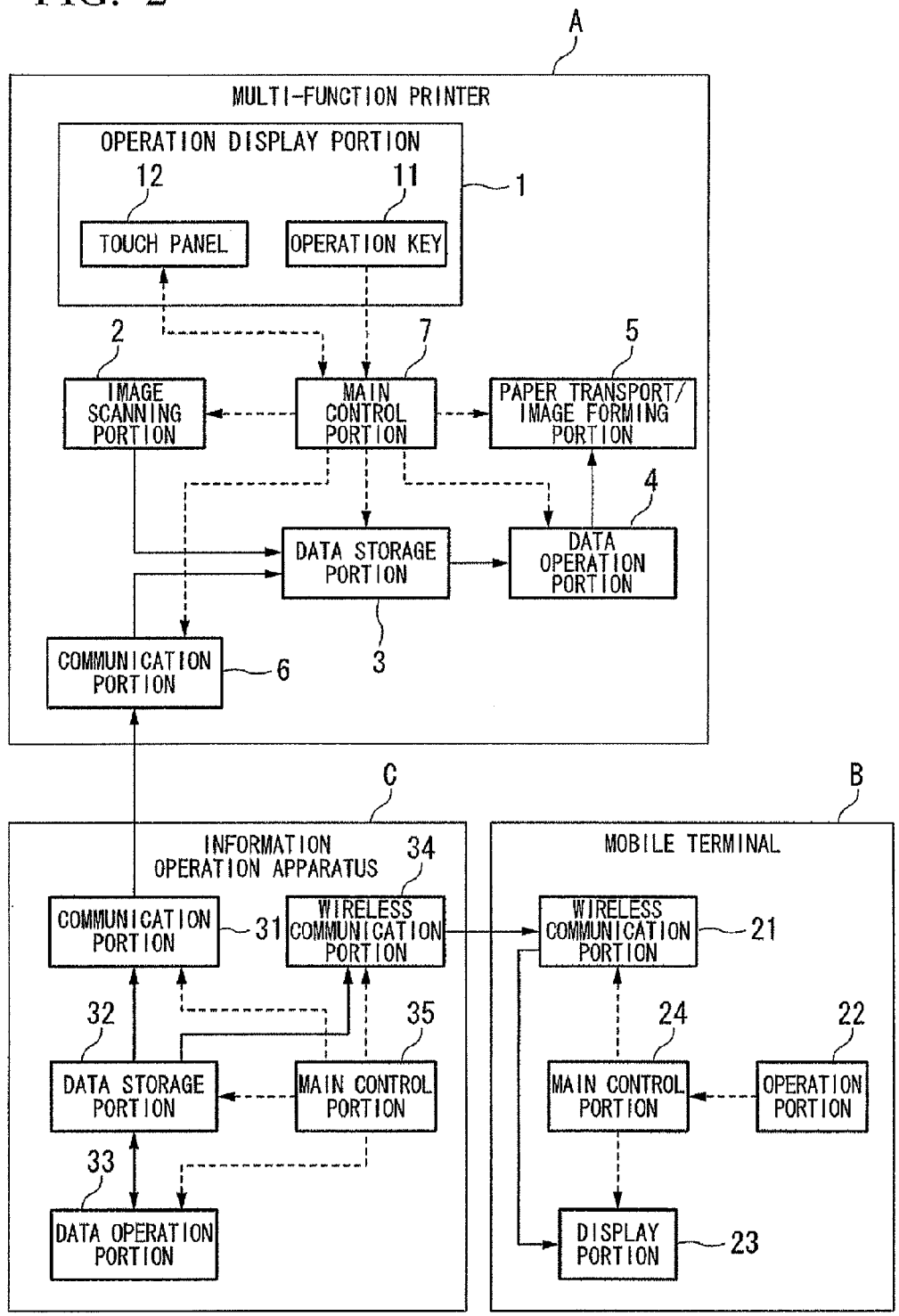
FIG. 2 is a functional block diagram of an image forming system S of a first embodiment including a multi-function printer A, a mobile terminal B and an information operation apparatus C.

As shown in FIG. 2, the multi-function printer A includes an operation display portion 1, an image scanning portion 2, a data storage portion 3, a data operation portion 4, a paper transport/image forming portion 5, a communication portion 6 and a main control portion 7.

The operation display portion 1 includes operation keys 11 and a touch panel 12 and has a function as a man-machine interface which establishes a relationship between the user and the multi-function printer A. The operation display portion 1 receives an operation command corresponding to the operation key 11 when being pressed and/or an operation button shown on the touch panel 12 and outputs the operation command to the main control portion 7, and in addition, the operation display portion 1 displays various screens on the touch panel 12 based on control signals from the main control portion 7.

The image scanning portion 2, by using a line sensor, scans an image (paper image) of a paper which is automatically fed by an automatic paper feeder A1 based on a control signal input from the main control portion 7 or which is put on a platen glass, converts the paper image to paper image data and outputs the paper image data to the data storage portion 3.

The data storage portion 3 is, for example, a semiconductor memory and/or a hard disc device, stores the paper image data and the PDL format data input from the information operation apparatus C in accordance with the control signal input from the main control portion 7, reads such data, and outputs it to the data operation portion 4.

The data operation portion 4, based on a control signal input from the main control portion 7, conducts various image processing operations (for example, image processing operations corresponding to an enlarged/reduced copy) on the paper image data input from the data storage portion 3, converts the paper image data to the bitmap image data which is in an image forming format, that is, converts the RGB image (colored image data) based on three primary colors of the light to the YMCK image data constituted from basic colors of Y (yellow), M (magenta), C (cyan) and K (black), and outputs the converted data to the paper transport/image forming portion 5. Further, based on the control signal input from the main control portion 7, the data operation portion converts the PDL format data which is input from the data storage portion 3 to the bitmap image data of the image forming format, and outputs the converted data to the paper transport/image forming portion 5.

The paper transport/image forming portion 5 includes, for example, a print engine (for example, a photoconductor drum, an electrifier, a developing device and a fuser roller), a feed roller and a delivery roller. Based on the control signal of the main control portion 7, the paper transport/image forming portion 5 transports the printing paper from a paper cassette (not shown in the drawings), forms the image on the printing paper based on the bitmap image data input from the data operation portion 4 and delivers the printing paper to a catch tray (not shown in the drawings).

The communication portion 6 is connected to the information operation apparatus C via a communication cable and conducts a communication operation with the information operation apparatus C based on the control signal from the main control portion 7.

The main control portion 7 is constituted from, for example, a CPU (central processing unit), a ROM (read only memory) and an interface circuit which conducts input/output operations of signals from/to the above-described operation display portion 1, image scanning portion 2, data storage portion 3, data operation portion 4, paper transport/image forming portion 5 and communication portion 6, and the main control portion 7 controls overall operations of the multi-function printer A based on both a control program stored in the ROM and operation commands input via the operation display portion 1. It should be noted that the control program stored in the ROM includes an image forming control program, and the main control portion 7 controls an image forming operation based on the image forming control program.

Hereinafter, a constitution of the above-described mobile terminal B is explained in reference to FIG. 2.

As shown in FIG. 2, the mobile terminal B includes a wireless communication portion 21, an operation portion 22, a display portion 23 and a main control portion 24.

The wireless communication portion 21 conducts a communication operation with the information operation apparatus C via the wireless LAN based on a control signal input from the main control portion 24.

The operation portion 22 is constituted from various operation keys, for example, numeric keys, arrow keys and function keys, receives operation commands from a user via such operation keys and outputs the operation commands to the main control portion 24.

The display portion 23 is, for example, a liquid crystal display and shows various screens including images and characters based on a control signal input from the main control portion 24.

The main control portion 24 is constituted from, for example, a CPU (central processing unit), a ROM (read only memory), a RAM (random access memory) and an interface circuit which conducts input/output operations of signals from/to the above-described wireless communication portion 21, operation portion 22 and display portion 23, and the main control portion 24 controls overall operations of the mobile terminal B based on both a control program stored in the ROM and operation commands input via the operation portion 22. It should be noted that the control program stored in the ROM includes a screen control program, and the main control portion 24 controls a screen based on the screen control program.

Hereinafter, a constitution of the above-described information operation apparatus C is explained in reference to FIG. 2.

As shown in FIG. 2, the information operation apparatus C includes a communication portion 31, a data storage portion 32, a data operation portion 33, a wireless communication portion 34 and a main control portion 35.

The communication portion 31 is connected to the multi-function printer A via a communication cable, conducts a communication operation with the multi-function printer A based on a control signal input from the main control portion 35.

The data storage portion 32 is, for example, a semiconductor memory and/or a hard disc device that stores screen data of a screen which is received from outside portion (for example, an external storage medium such as a USN memory and/or a distribution server) and which is displayed on the wireless terminal B and image forming target data of, for example, a PDF format and/or JPEG format which relates to the screen data, and the data storage portion reads and outputs the image forming target data to the data operation portion 33. Further, the data storage portion 32 stores intermediate printing format data, for example, PDL format data, generated by the data operation portion 33 as described below, and the data storage portion 32 reads and outputs the PDL format data to the communication portion 31. It should be noted that the data which relates to the screen data in which information corresponding to the screen data is shown. Further, the above-described external portion is, for example, an external server and/or an external storage medium such as a USB memory.

The data operation portion 33 converts the data such as PDF and/or JPEG input from the data storage portion 32 to the PDL format data based on a control signal from the main control portion 35, and the data operation portion 33 outputs the PDL format data to the data storage portion 32.

The wireless communication portion 34 communicates with the mobile terminal B via the wireless LAN based on a control signal input from the main control portion 35.

The main control portion 35 is constituted from, for example, a CPU (central processing unit), a ROM (read only memory), a RAM (random access memory) and an interface circuit which conducts input/output operations of signals from/to the above-described communication portion 31, data storage portion 32, data operation portion 33 and wireless communication portion 34, and the main control portion 35 controls overall operations of the information operation apparatus C based on a control program stored in the ROM. It should be noted that the control program stored in the ROM includes an image forming system control program, and the main control portion 35 controls the image forming system S based on the image forming system control program.

Figure 3:
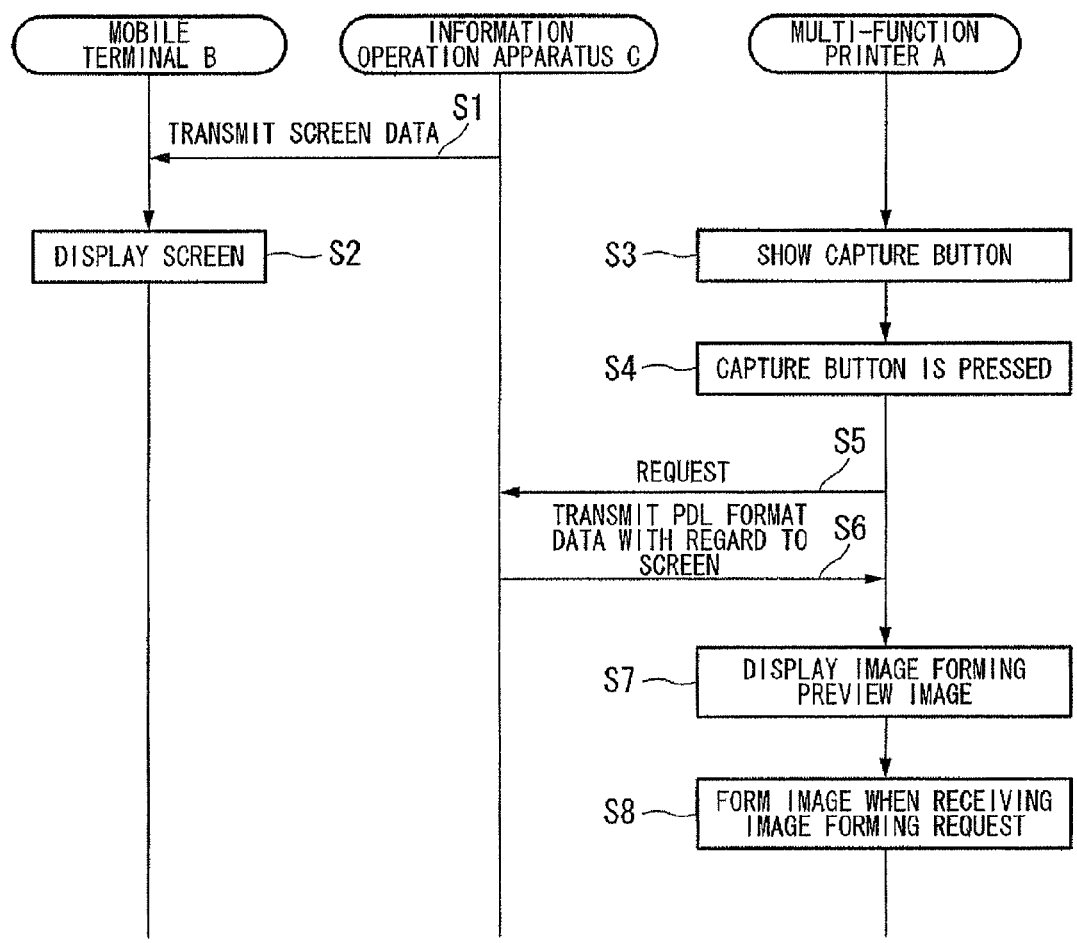
FIG. 3 is a flowchart describing operations of an image forming system S of a first embodiment including a multi-function printer A, a mobile terminal B and an information operation apparatus C.

Hereinafter, operations of the multi-function printer A, mobile terminal B and information operation apparatus C of the image forming system S are explained in reference to FIG. 3.

In the information operation apparatus C, the main control portion 35 requests the wireless communication portion 34 to transmit the screen data stored in the data storage portion 32 to the wireless terminal B (Step S1).

In the mobile terminal B, when the wireless communication portion 21 receives the screen data from the information operation apparatus C, the main control portion 24 requests the display portion 23 to show a window based on the screen data (Step S2). It should be noted that the screen shown on the display portion 23 is switched to various screens at a predetermined time interval.

In the multi-function printer A, the main control portion 7 requests the touch panel 12 to show a capture button (Step S3).

While checking the screens shown on the display portion 23 of the mobile terminal B, the user presses the capture button shown on the touch panel 12 of the multi-function printer A when a screen which the user wants is displayed.

In the multi-function printer A, when the capture button is pressed, in other words, when an image forming confirmation request is received (Step S4), the main control portion 7 transmits a request for the PDL format data corresponding to the screen shown on the mobile terminal B to the information operation apparatus C via the communication portion 6 (Step S5).

Here, a case is explained in which the image forming confirmation request is invoked by pressing the capture button shown on the touch panel 12 of the multi-function printer A. On the other hand, it is naturally possible to invoke the image forming confirmation request by pressing the capture button which is displayed while checking the screens shown on the display portion 23 of the mobile terminal B.

In the information operation apparatus C, when the communication portion 31 receives the request from the multiple-function printer A, the main control portion 35 requests the communication portion 31 to transmit the PDL format data stored in the data storage portion 32 to the multiple-function printer A (Step S6).

In the multi-function printer A, when the communication portion 6 receives the PDL format data from the information operation apparatus C, the main control portion 7 requests the touch panel 12 to show an image forming preview image based on the PDL format data (Step S7). After Step S7, when the operation display portion 1 receives an image forming command, the main control portion 7 requests the paper transport/image forming portion 5 to form the image based on the PDL format data (Step S8).

As described above, the image forming system S of this embodiment shows an image forming preview image based on the PDL format data, and the image forming system S forms the image based on the PDL format data when receiving the image forming command. In other words, in accordance with this embodiment, the user confirms the image forming preview image, and afterwards, the image is formed when receiving the image forming command, and accordingly, it is possible to form the image which the user wants.

Hereinbefore, the first embodiment is explained above which is not a limitation for the present invention, and for example, there are modifications shown below.

(1) In the above-described embodiment, the capture button is displayed on the touch panel 12 of the multi-function printer A, and it is determined that the image forming confirmation command is received when the capture button is pressed. However, this is not a limitation.

For example, it is possible that the capture button is shown on the display portion 23 of the mobile terminal B, and it can be determined that the image forming confirmation command is received when the capture button is pressed via operations on the operation portion 22. In such a case, the main control portion 24 requests the wireless communication portion 21 to transmit a notification of the image forming command to the information operation apparatus C when the operation portion 22 of the mobile terminal B receives the image forming command, and the information operation apparatus C transmits the PDL format data corresponding to the screen displayed on the mobile terminal B when the wireless communication portion 34 receives the notification from the mobile terminal B. The multi-function printer A shows the image forming preview image on the touch panel 12 based on the PDL format data, and the multi-function printer A forms the image based on the PDL format data when receiving the image forming command.

(2) In the above-described embodiment, the multi-function printer A and the information operation apparatus C are independent apparatuses. However, it is possible for the multi-function printer A to include the information operation apparatus C.

(3) In the above-described embodiment, the mobile terminal B is used as a display device. However, it is possible to use, for example, a liquid crystal display as a display device.

(4) In the above-described embodiment, the information operation apparatus C transmits the PDL format data as the image forming data to the multi-function printer A. However, this is not a limitation. For example, it is possible for the information operation apparatus C to transmit the image forming target data in a data format such as PDF and/or JPEG before converting to the PDL format data as the image forming data to the multi-function printer A.

(5) The multi-function printer A of the above-described embodiment shows the image forming preview image based on the PDL format data when receiving the image forming data such as the PDL format data and/or the image forming target data from the information operation apparatus C. However, this is not a limitation. For example, other than the image forming preview image, it is possible for the multi-function printer A to display images of marks such as numeric symbols on the touch panel 12, and each of such marks corresponds to or indicates one of the screens of the PDL format data displayed on the mobile terminal B. In other words, it is possible for the multi-function printer A of this embodiment to display the screen corresponding to or indicating the PDL format data when receiving the PDL format data corresponding to the image displayed on the mobile terminal B from the information operation apparatus C.

Here, where the image forming data is, for example, the image forming target data such as PDF and/or JPEG, the intermediate printing format data is generated by converting such image forming target data and the finally generated printing format data such as a bitmap is generated by further converting such intermediate printing format data.

(6) The multi-function printer A of the above-described embodiment shows the image forming preview image based on the PDL format data when receiving the PDL format data corresponding to the screen displayed on the mobile terminal B from the information operation apparatus C. However, this is not a limitation. For example, if the image shown on the mobile terminal B is a moving picture, it is possible for the multi-function printer A to receive the PDL format data of a predetermined frame of the moving picture shown on the mobile terminal B and to display the image forming preview image based on the PDL format data. Further, the multi-function printer A that receives the PDL format data of an image, based on the contents of the screens shown on the mobile terminal B, displays the image forming preview image based on the PDL format data. In addition, the multi-function printer A receives the PDL format data which relates to the screen displayed on the mobile terminal B and which is different from the screen displayed on the mobile terminal B from the information operation apparatus C and displays the image forming preview image based on the PDL format data.

(7) It is possible to implement the above-described embodiment by using software.

In accordance with the above-described embodiment, an image which indicates the image forming data is displayed, and the image is formed based on the image forming data when the image forming command is received. In other words, in the above-described embodiment, the user observes the image forming data which is a target of image forming by looking at the image, and further, the image is formed when the image forming command is received. Therefore, for example, it is possible to form the image corresponding to the image forming data which the user wants.

What is claimed is:

1. An image forming system comprising:
   an information operation apparatus which provides screen data, which is variable, and image forming data corresponding to the screen data;
   an image forming apparatus which communicates with the information operation apparatus; and
   a display apparatus which communicates with the information operation apparatus and which displays an image on a display portion based on the screen data received from the information operation apparatus, wherein
   when receiving an image forming confirmation command, regardless of whether or not the screen data is varied, the image forming apparatus receives the image forming data corresponding to the image displayed on the display apparatus from the information operation apparatus, displays an image which indicates the image forming data and forms an image based on the image forming data if an image forming command is received.

2. The image forming system according to claim 1, wherein when receiving the image forming confirmation command, the image forming apparatus receives the image forming data corresponding to the image displayed on the display apparatus from the information operation apparatus, displays an image forming preview image which corresponds to the image forming data and forms an image based on the image forming data if an image forming command is received.

3. The image forming system according to claim 2, wherein the display apparatus shows a moving picture, and when receiving the image forming confirmation command, the image forming apparatus receives image forming data of a predetermined frame of an image of the moving picture shown on the display apparatus from the information operation apparatus, and displays an image forming preview image based on the image forming data corresponding to a screen shown on the display apparatus.

4. The image forming system according to claim 2, wherein when receiving the image forming confirmation command, the image forming apparatus receives the image forming data of an image which is generated by gathering contents of the screen shown on the display apparatus from the information operation apparatus, and displays an image forming preview image based on the image forming data corresponding to a screen shown on the display apparatus.

5. The image forming system according to claim 2, wherein when receiving the image forming confirmation command, the image forming apparatus receives the image forming data of an image which relates to the screen shown on the display apparatus and which is different from the screen shown on the display apparatus from the information operation apparatus, and displays an image forming preview image based on the image forming data corresponding to a screen shown on the display apparatus.

6. The image forming system according to claim 1, wherein the display apparatus comprises an operation portion, and when the operation portion receives the image forming confirmation command, the information operation apparatus outputs image forming data which relates to a screen shown on the display apparatus to the image forming apparatus, and the image forming apparatus displays an image forming preview image which corresponds to the image forming data corresponding to the screen shown on the display apparatus, and forms the image based on the image forming data if the image forming command is received.

7. The image forming system according to claim 1, wherein the display apparatus is a mobile terminal.

8. An image forming apparatus comprising:
   an image forming portion;
   a control portion which requests the image forming portion to form an image when receiving an image forming command; and
   an information operation apparatus comprising:
     a data providing portion which provides screen data, which is variable, and image forming data that relates to the screen data;
   the image forming apparatus further comprising:
     a communication portion which is connected to and communicates with a display apparatus; and
   a display portion, wherein
   the control portion requests the display apparatus to show an image based on the screen data which is output via the communication portion,
   the control portion requests the display portion to show the image indicating the image forming data corresponding to the image displayed on the display apparatus, regardless of whether or not the screen data is varied, when receiving an image forming confirmation command, and
   the control portion requests the image forming portion to form an image when receiving an image forming command.

9. The image forming apparatus according to claim 8, wherein
   when receiving the image forming confirmation command, the control portion requests the display portion to display an image forming preview image based on the image forming data corresponding to the image shown on the display apparatus.

10. The image forming apparatus according to claim 9, wherein
when receiving the image forming confirmation command, the control portion requests the display portion to display an image forming preview image based on the image forming data of a predetermined frame of an image of the moving picture shown on the display apparatus.

11. The image forming apparatus according to claim 9, wherein
when receiving the image forming confirmation command, the control portion requests the display portion to display an image forming preview image based on the image forming data of an image which is generated by gathering contents of the screen shown on the display apparatus.

12. The image forming apparatus according to claim 9, wherein
when receiving the image forming confirmation command, the control portion requests the display portion to display an image forming preview image based on the image forming data of an image which relates to the screen shown on the display apparatus and which is different from the screen shown on the display apparatus.

13. The image forming apparatus according to claim 8, wherein
when the communication portion receives the image forming confirmation command from the display apparatus, the control portion requests the display portion to show the image indicating the image forming data corresponding to the screen displayed on the display apparatus, and
the control portion requests the image forming portion to form an image when receiving an image forming command.

14. An image forming method comprising:
a step of displaying image data received from an information operation apparatus on a terminal apparatus, the image data being variable;
a step of transmitting predetermined format data from the information operation apparatus to an image forming apparatus when receiving a capture command from a user;
a step of displaying a preview on a screen of the image forming apparatus based on the predetermined format data; and
a step of forming an image, corresponding to the preview regardless of whether or not the image data is varied, by using the image forming apparatus when receiving an image forming command from the user.

15. An image forming system comprising:
an information operation apparatus which provides screen data and image forming data corresponding to the screen data;
an image forming apparatus which communicates with the information operation apparatus; and
a display apparatus which communicates with the information operation apparatus and which displays an image on a display portion based on the screen data received from the information operation apparatus, wherein
when receiving an image forming confirmation command the image forming apparatus receives the image forming data corresponding to the image displayed on the display apparatus from the information operation apparatus, displays an image which indicates the image forming data and forms an image based on the image forming data if an image forming command is received,
when receiving the image forming confirmation command, the image forming apparatus receives the image forming data corresponding to the image displayed on the display apparatus from the information operation apparatus, displays an image forming preview image which corresponds to the image forming data and forms an image based on the image forming data if an image fanning command is received, and
when receiving the image forming confirmation command, the image forming apparatus receives the image forming data of an image which is generated by gathering contents of the screen shown on the display apparatus from the information operation apparatus, and displays an image forming preview image based on the image forming data corresponding to a screen shown on the display apparatus.

* * * * *